F. D. REINHARDT.
ICE CREAM FREEZER.
APPLICATION FILED APR. 23, 1919.
1,346,767.
Patented July 13, 1920.
2 SHEETS—SHEET 1.
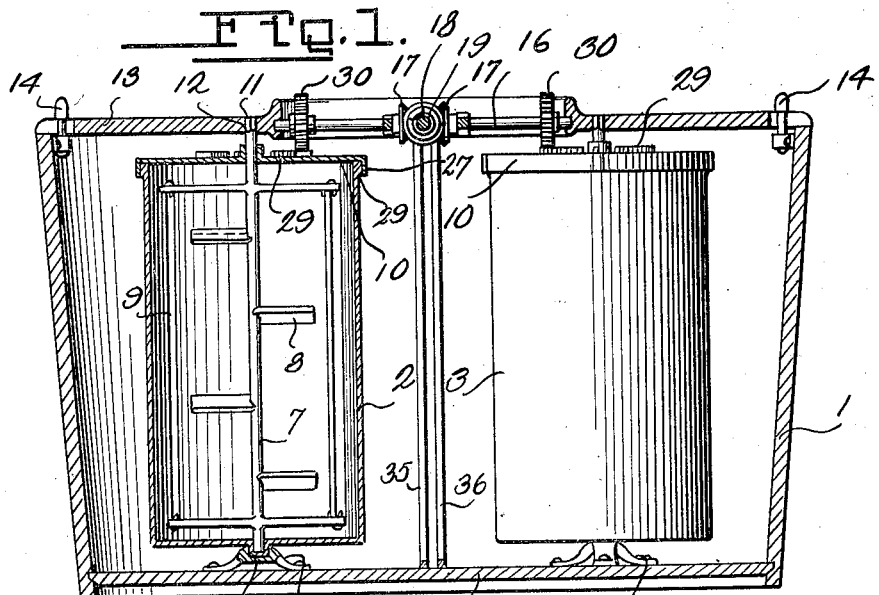
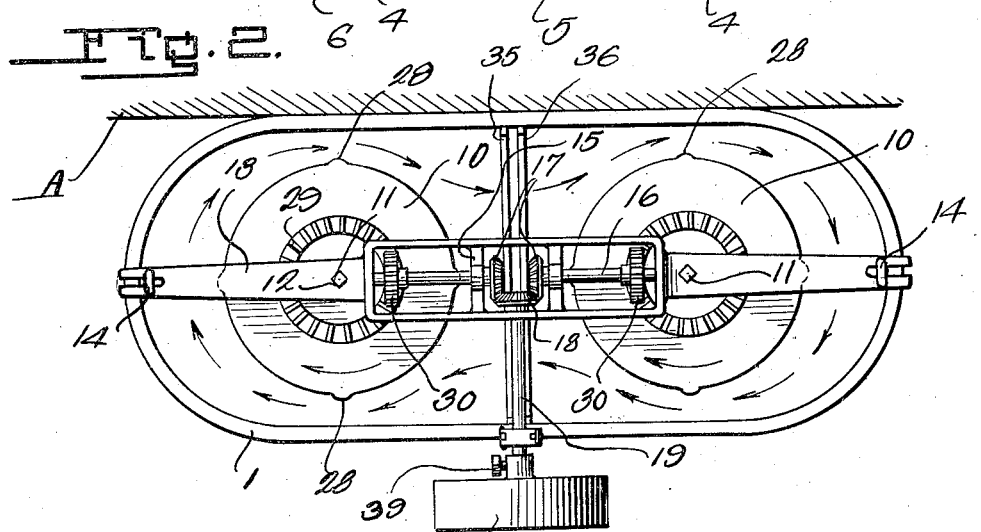
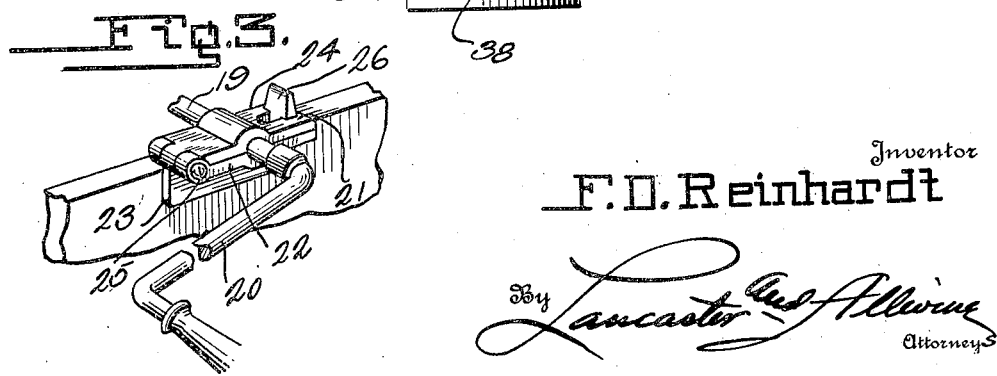
Inventor
F. D. Reinhardt
By Lancaster *and* Allwine
Attorneys

F. D. REINHARDT.
ICE CREAM FREEZER.
APPLICATION FILED APR. 23, 1919.

1,346,767.  Patented July 13, 1920.
2 SHEETS—SHEET 2.

Inventor
F. D. Reinhardt
By Lancaster and Allwine
Attorneys

UNITED STATES PATENT OFFICE.

FANNIE D. REINHARDT, OF BILLINGS, OKLAHOMA.

ICE-CREAM FREEZER.

1,346,767.　　　　Specification of Letters Patent.　　Patented July 13, 1920.

Application filed April 23, 1919. Serial No. 292,117.

*To all whom it may concern:*

Be it known that I, FANNIE D. REINHARDT, a citizen of the United States, residing at Billings, in the county of Noble and State of Oklahoma, have invented certain new and useful Improvements in Ice-Cream Freezers, of which the following is a specification.

This invention relates to an ice cream or confection freezer, and an object of the invention is to provide a device of this nature, which is simple and compact in structure, and embodies a pair of rotary confection retainers which rotate within an elongated substantially oval shaped ice container, causing a relatively free circulation of the freezing material, and consequently maintaining a more uniform freezing of the confection within the confection retainers.

Another object of the invention is to provide an ice cream or confection freezer as above specified which is normally adapted to contain two or more rotatable confection retainers, and a container for the freezing material is provided with guideways adapted to receive a partition to divide the interior of the said container for the freezing material into a pair of compartments, whereby only one of the confection containers may be subjected to the action of the freezing material if desired, the other confection retainer being removable.

Other objects of the invention will appear in the following detailed description, taken in connection with the accompanying drawings, forming a part of this specification and in which drawing:

Figure 1 is a vertical section through the improved freezer.

Fig. 2 is a top plan of the freezer.

Fig. 3 is a detailed perspective of a crank handle adapted for use with the freezer to rotate the confection container.

Figure 4:
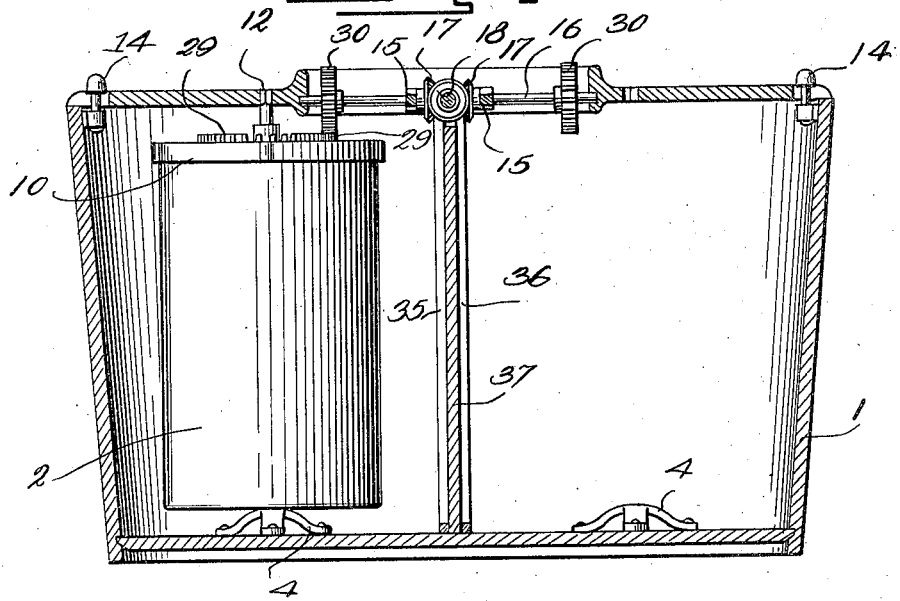
Fig. 4 is a vertical section through the container for the freezing material showing the partition in place.

Referring more particularly to the drawing, wherein like characters designate like and corresponding parts throughout the several views, 1 indicates the main container for the freezing material which may be ice and brine, as is ordinarily used in freezers of this type. The body 1 is substantially oval shaped in plan, presenting parallel flat side portions, enabling the container 1 to be placed against a wall as indicated at A, during the rotation of the confection retainers or containers 2 and 3, therein, for preventing movement of the entire freezer structure.

The freezing material retainer 1 has bearing members 4 positioned therein and resting upon the bottom 5 of the said container, which bearing members receive therein downstruck bearing portions 6 formed upon the lower end of the containers 2 and 3. These downstruck portions 6 are provided with recesses which in turn receive therein the lower end of the dasher rods 7. The dasher rods 7 have the ordinary type of dasher blades or paddles 8 connected thereto or formed thereon and also the dasher blades 9 which extend substantially parallel with the rods 7. The upper end of the dasher rods 7 extend through bearings in the covers 10 of the containers 2 and 3 and have their upper terminals rectangular shaped in cross section as shown at 11 and seated in openings 12 formed in the head bar 13 of the freezer structure whereby the dashers will be held stationary. The head bar 13 is extended longitudinally across the center of the ice or freezing material container 1 and it may be detachably connected thereto in any suitable manner such as by the catching devices indicated at 14. The intermediate portion of the head bar 13 is enlarged and provided with a rectangular opening, transversely of which bearing members 15 extend. These bearing members 15 rotatably support a shaft 16 upon which are mounted a pair of oppositely disposed beveled gears 17. The beveled gears 17 mesh with a beveled gear 18, which is carried by the rotating handle or rod 19, upon the outer end of which a crank handle 20 is formed. The rotating rod 19 is rotatably supported by a bearing structure 21, which comprises a lower rigid portion 22 attached by means of an attaching plate 23 to the container 1, substantially equi-distant its ends and at one side thereof. The lower relatively stationary section 22 of the bearing 21 has the upper section 24 thereof hingedly connected thereto as shown at 25 and this upper section is held closed, to confine the rod 19 therein by a catch structure 26, preventing the rod from jumping out of its bearing, during rotation thereof and also permitting removal of the rod from the bearing when the head bar 13 is removed from the freezer for the purpose of removing the confection from the containers 2 or 3.

The covers 10 of the containers 2 or 3 are provided with depending flanges 27 which have outstruck portions 28 formed therein at spaced intervals. These outstruck portions engage enlargements 29 formed upon the containers 2 and 3 for connecting the covers to the containers whereby the covers and containers will rotate in unison. The covers 10 have crown gears 29' formed upon their upper surfaces which mesh with gears 30 mounted upon the shaft 16, whereby the containers 2 and 3 will be rotated by the rotation of the rod 19. When the containers 2 and 3 are rotated in clockwise direction, the freezing material will be circulated within the container 1, in the path indicated by the arrow, in Fig. 2 of the drawings, thus maintaining a more uniform freezing as well as a more rapid freezing of the confection in the containers 2 and 3.

The container 1 for the freezing material has a pair of spaced beads 35 and 36 attached to its inner surface, intermediate its ends as clearly shown in the drawings, the said beads being spaced to form guides for receiving therebetween a removable partition 37, which divides the interior of the container 1 into two separate compartments as shown clearly in Fig. 4 of the drawings, thus permitting the use of only one of the confection freezers 2 at a time, if it is so desired. When only one of the confection freezers 2 or 3 is used, the other is removed from the empty compartment of the freezing material container 1, thereby materially lightening the load upon the shaft 19.

Figure 5:
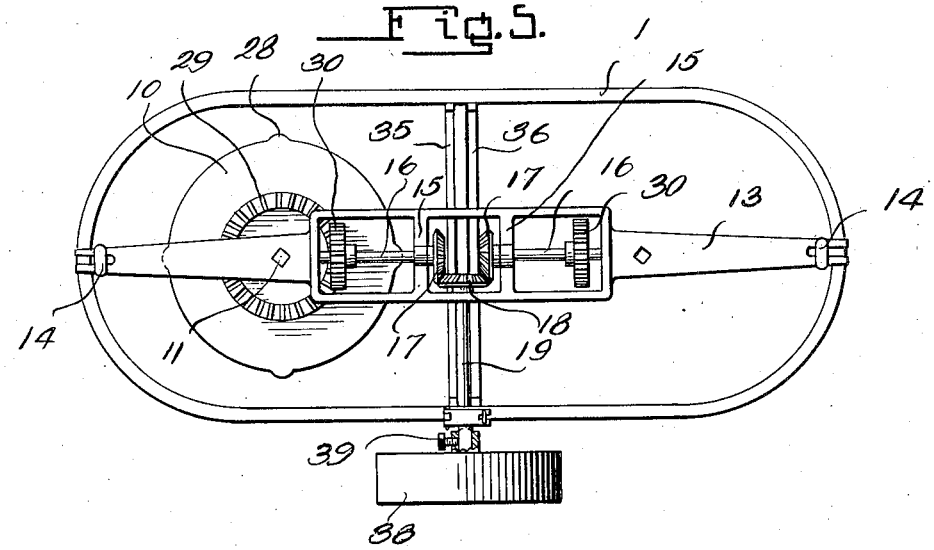
Fig. 5 is a plan view of the freezing material container showing only one container for confection therein.

As shown in Figs. 2 and 5 of the drawings, a pulley wheel 38 may be mounted upon the rectangular or square end of the shaft 19 being retained thereon, against independent movement with respect to the shaft by a set screw 39.

Changes in details may be made without departing from the spirit of this invention; but

I claim:

1. In a confection freezer, a substantially oval shaped freezing material container having flat parallel arranged side walls, a pair of confection containers rotatably mounted in the first mentioned container, a head bar arranged longitudinally of the first mentioned container, means carried by the first mentioned container for detachably engaging the head bar for holding the same against displacement, a spider carried by the hub bar, a longitudinally disposed shaft rotatably carried by the spider, gears keyed to the shaft, gears formed on the confection container and arranged to be engaged by the first mentioned gears, a right angularly disposed shaft carried by the spider, means operatively connecting the right angularly disposed shaft with the first mentioned shaft, and means for rotating said right angularly disposed shaft.

2. In a confection freezer, a freezing material container, a pair of confection containers rotatably mounted in the first mentioned container, a head bar arranged longitudinally of the first mentioned container, means carried by the container for detachably engaging the terminals of the head bar, a spider carried by the central portion of said bar, a pair of spaced shafts rotatably carried by the spider and arranged longitudinally of the bar, gear wheels keyed to the shaft, gears carried by the confection container and arranged to be engaged by the first mentioned gears, a right angularly disposed shaft carried by the spider, beveled gears operatively connecting the first mentioned shafts with the right angularly disposed shaft, means for operating the right angularly disposed shaft, and means carried by the first mentioned container for engaging the right angularly disposed shaft to prevent the accidental movement thereof in relation to the first mentioned container.

FANNIE D. REINHARDT.